May 9, 1961

R. E. BOEHLER 2,983,501

APPARATUS AND METHOD FOR TAPPING MOLTEN
MATERIAL FROM A ROTARY KILN

Filed Dec. 2, 1954

INVENTOR.
ROBERT E. BOEHLER
BY
Donald G. Dalton
HIS ATTORNEY

May 9, 1961 R. E. BOEHLER 2,983,501
APPARATUS AND METHOD FOR TAPPING MOLTEN
MATERIAL FROM A ROTARY KILN
Filed Dec. 2, 1954 4 Sheets-Sheet 2

INVENTOR.
ROBERT E. BOEHLER
BY Donald G. Dalton
HIS ATTORNEY

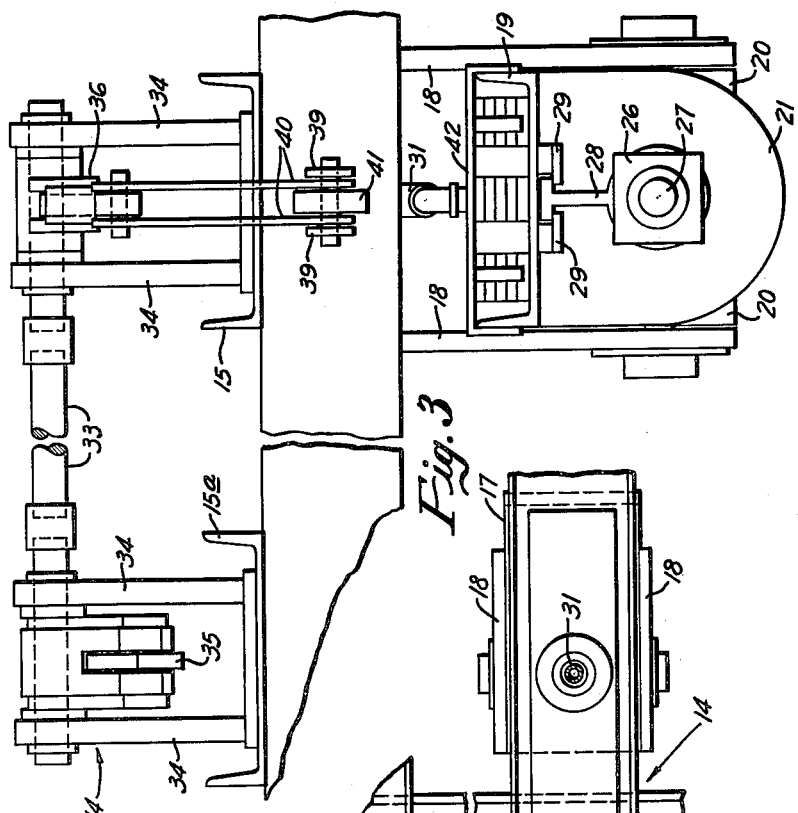
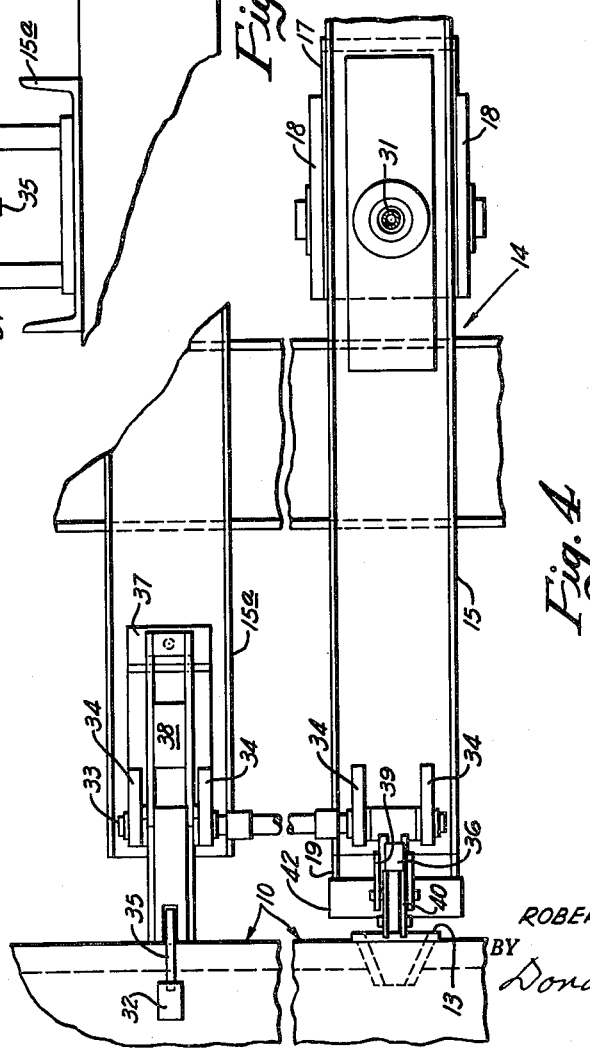

May 9, 1961 R. E. BOEHLER 2,983,501
APPARATUS AND METHOD FOR TAPPING MOLTEN
MATERIAL FROM A ROTARY KILN
Filed Dec. 2, 1954 4 Sheets-Sheet 4
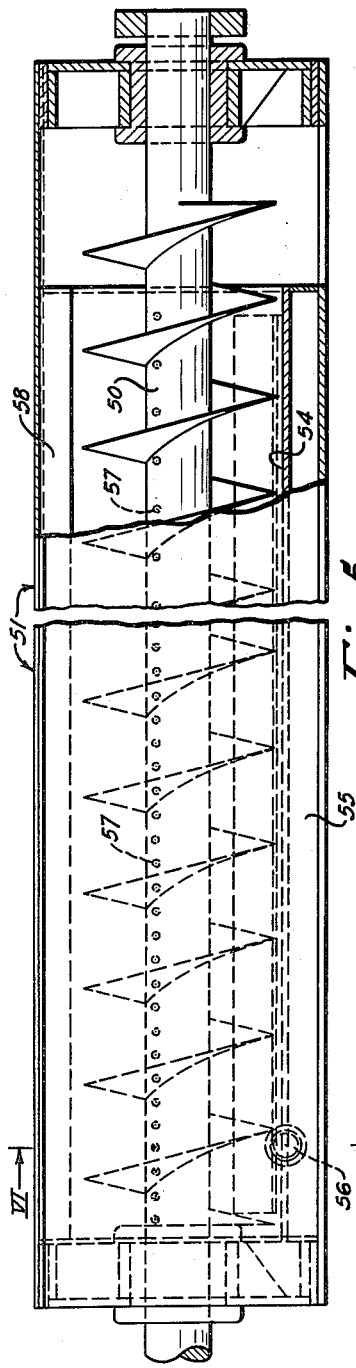
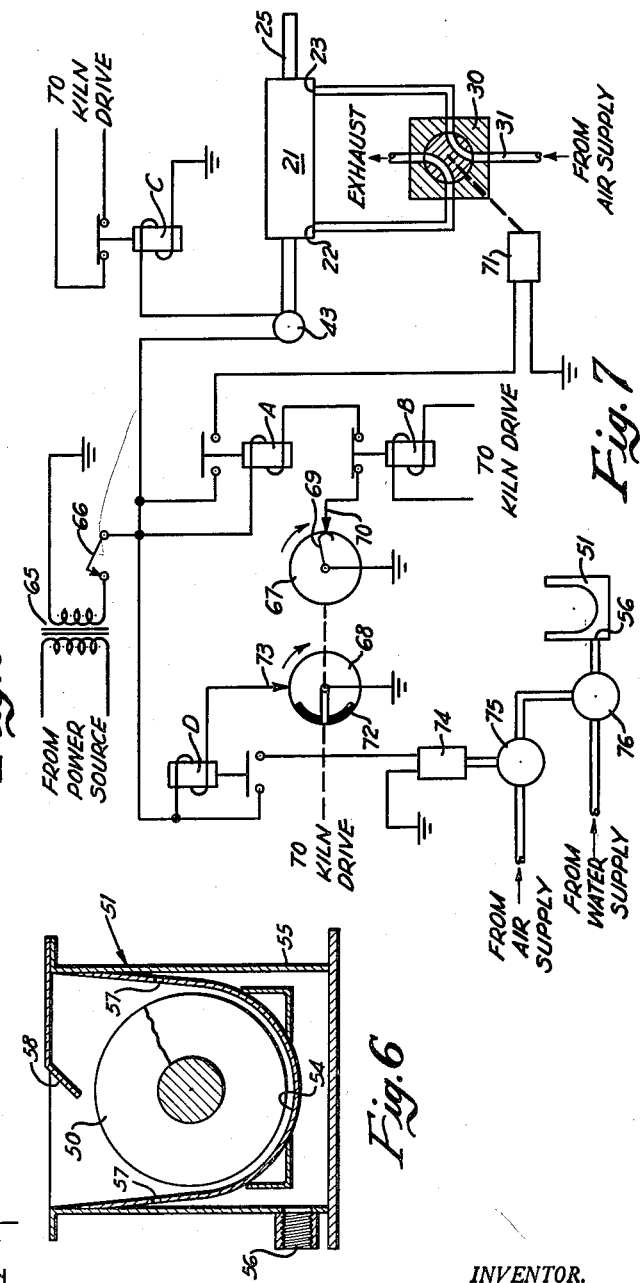
INVENTOR.
ROBERT E. BOEHLER
BY
Donald G. Dalton
HIS ATTORNEY United States Patent Office 2,983,501
Patented May 9, 1961

2,983,501
APPARATUS AND METHOD FOR TAPPING MOLTEN MATERIAL FROM A ROTARY KILN

Robert E. Boehler, Gary, Ind., assignor to United States Steel Corporation, a corporation of New Jersey Filed Dec. 2, 1954, Ser. No. 472,671

25 Claims. (Cl. 263—33)

This invention relates to an improved apparatus and method for tapping molten material from a rotary kiln.

Although my invention is not limited to tapping any specific material, an example of an operation where it is particularly useful is in the manufacture of calcium aluminate cement. Such cement commonly is produced in a rotary kiln heated to about 2500° F. The cement is molten at this temperature, but freezes if the temperature drops to about 2300° F. The kiln has a tap hole which is opened periodically for tapping, but which is plugged with clay after tapping is completed. The conventional practice has been to stop the kiln after approximately each 25 minutes of operation, open the tap hole with a jackhammer, turn the kiln to place the open tap hole at the underside, and allow molten clinker to flow from the hole for about five minutes before resuming operation. The clinker commonly is received in a pan conveyor where it freezes in large chunks that are difficult to crush. The time consumed in tapping is of course a direct loss in production time, in addition to which there is a loss due to cooling of the kiln.

An object of my invention is to provide an improved apparatus and method for tapping molten materials from a rotary kiln during a portion of each revolution without stopping the kiln, thereby increasing production.

A further object is to provide an improved apparatus and method for keeping a tap hole of a rotary kiln open and so that molten material discharges during a portion of each revolution, even though the material normally would freeze the hole shut.

A further object is to provide an improved apparatus and method for receiving and handling molten material tapped from a kiln to produce a granulated product on solidification.

A more specific object is to provide, in combination with a rotary kiln, a device for entering the tap hole once each kiln revolution to maintain the hole open so that it discharges material whenever it rotates to the lower part of the kiln, and a specially constructed screw conveyor located under the kiln for receiving molten material and granulating the material as it solidifies.

Other objects are to provide, as subcombinations of the foregoing, first a device for periodically entering a tap hole and keeping it open, and second an improved screw conveyor for receiving molten material and granulating the material as it solidifies.

In accomplishing these and other objects of the invention, I have provided improved details of structure, a preferred form of which is shown in the accompanying drawings, in which:

Figure 3 is a vertical sectional view on a larger scale on line III—III of Figure 2;

Figure 4 is a top plan view of the tapping device;

Figure 5 is a side elevational view, partly in section, of my improved receiver for molten material from the kiln;

Figure 6 is a vertical sectional view on line VI—VI of Figure 5; and

Figure 7 is a circuit diagram.

Figure 1:
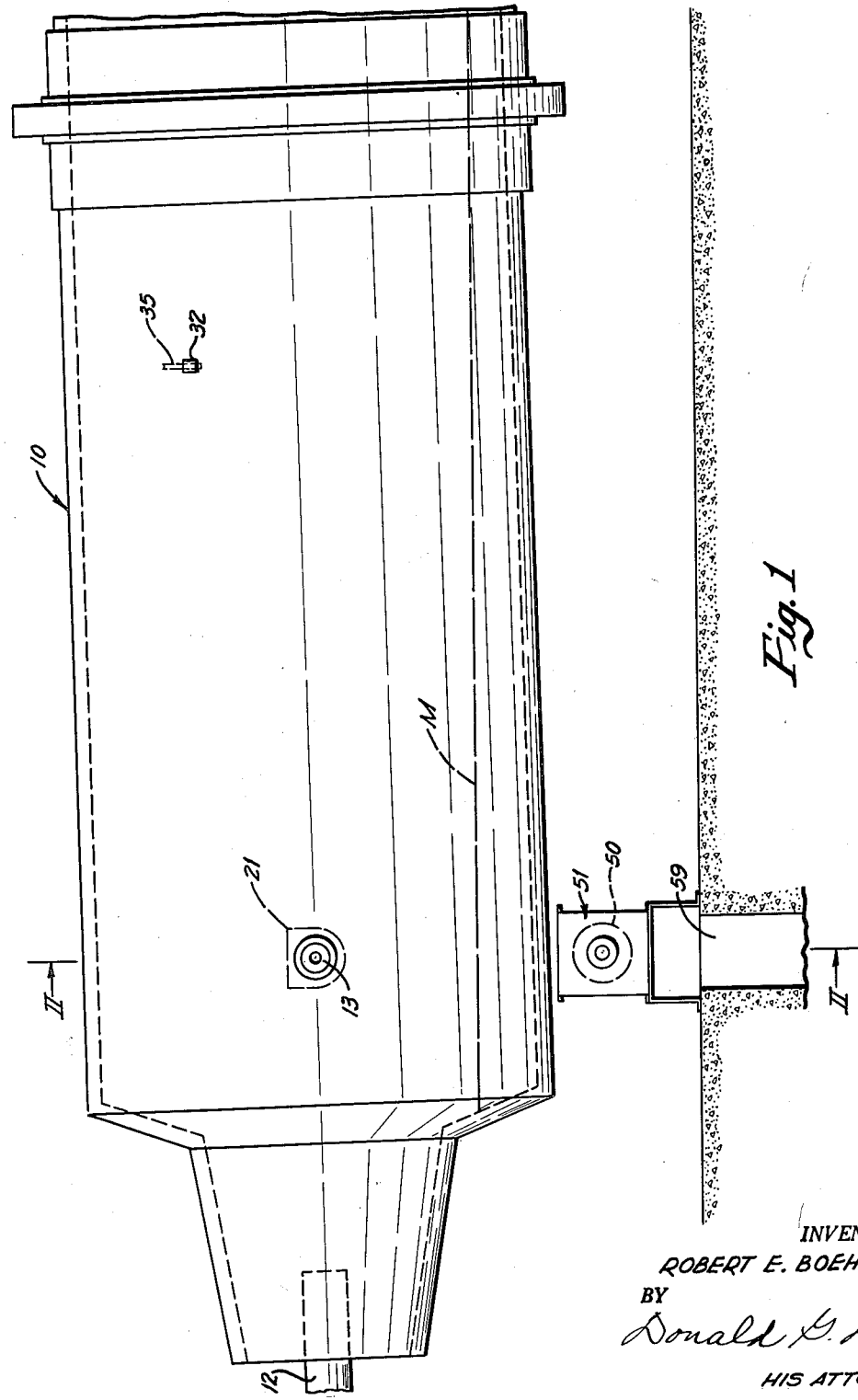
Figure 1 is a side elevational view of a rotary kiln and receiver to which my tapping device can be applied.
Figure 2:
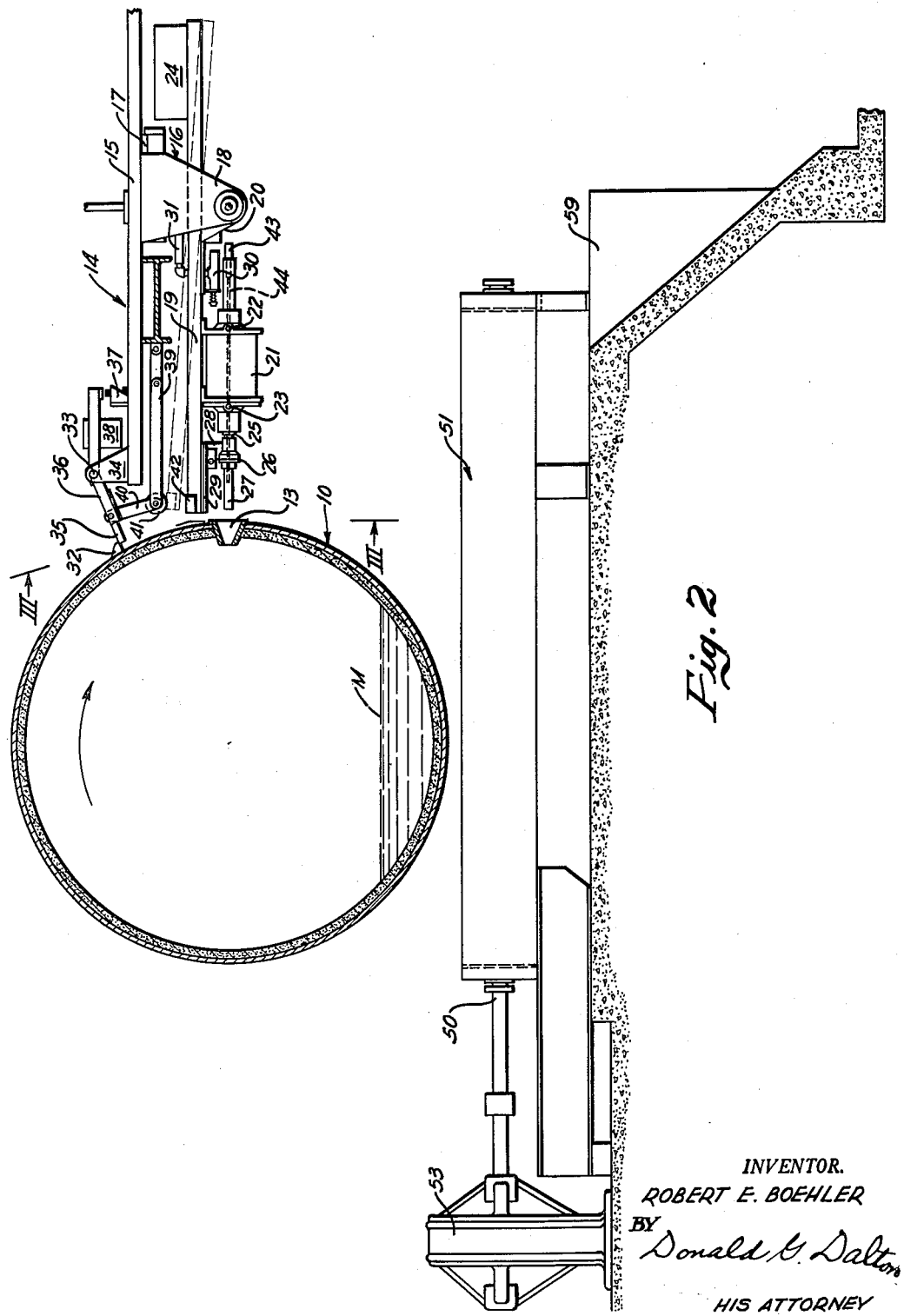
Figure 2 is a vertical sectional view on line II—II of Figure 1 with the tapping device installed.

Figures 1 and 2 show somewhat diagrammatically a rotary kiln 10 which, apart from details hereinafter pointed out, can be of any standard or desired construction. When used in the manufacture of calcium aluminate cement, the kiln commonly has a steel shell and a refractory lining of cement produced in the kiln and frozen on the inner surface of the shell. The outside commonly is water cooled to assist in freezing this lining. Normally the kiln is driven in a clockwise direction, as viewed in Figure 2, at a relatively slow substantially constant speed by any suitable drive mechanism not shown, although the drive mechanism is capable of varying the speed or reversing the direction of rotation. The kiln slopes toward its exit end, and is fired from a burner 12 at this end in the conventional manner. A pool of molten material M is formed within the kiln. The kiln has an outwardly flared tap hole 13 near its exit end. Even if not plugged, the tap hole soon would freeze over along with the lining.

In accordance with my invention, a device 14 for entering the tap hole once each kiln revolution is situated on the downwardly rotating side (i.e. the right as viewed in Figure 2). The supporting frame for the device includes a beam 15 on which a depending swivel yoke 16 is pivoted to turn on a substantially vertical axis. The yoke includes a horizontal pivot plate 17 and a pair of spaced apart vertical side plates 18 which can be adjusted longitudinally of said pivot plate. The yoke supports a tilt channel 19, which has a pair of trunnion plates 20 pivoted to the side plates 18 of the yoke to turn on a substantially horizontal axis. The underside of the tilt channel carries a double-acting pneumatic cylinder 21, which is located between the trunnion plates and the kiln and has back and front ports 22 and 23 respectively for admitting and discharging compressed air. The other end of the tilt channel carries a counterweight 24, which slightly overbalances the cylinder 21 and its associated parts, hereinafter described.

A reciprocable piston and piston rod 25 are mounted in the cylinder 21. The end of the piston rod adjacent the kiln carries a plunger seat 26 in which a cylindrical plunger 27 is fixed. To guide movement of the piston rod and plunger, the piston rod preferably carries an upstanding crosshead 28 that rides in a guide 29 fixed to the bottom of the tilt channel 19 (Figure 3). The swivel yoke 16 and tilt channel 19 normally occupy a position with respect to the beam 15 such that the plunger is in the same vertical plane as the tap hole 13 whenever the latter rotates to this side of the kiln. Since the kiln slopes, the vertical plane of the tap hole of course varies during kiln rotation. The pivotal connection between the yoke 16 and beam 15 also allows the plunger to follow the tap hole when the latter moves horizontally.

The back and front ports 22 and 23 of the cylinder 21 are connected via suitable conduits with a solenoid operated four-way valve 30. The latter is connected to a compressed air supply via a conduit 31 and also has an exhaust. Normally the valve 30 connects the front port 23 with the air supply and connects the back port 22 with the exhaust to hold the piston rod 25 and plunger 27 retracted. Once each kiln revolution, when the tap hole 13 moves into alignment with the plunger 27, a timing device hereinafter described operates the valve 30 to admit air to the cylinder 21 in the reverse direction and thus move the plunger 27 into the tap hole. An instant later the timing device returns the valve to normal position to retract the plunger. The kiln 10 continues to rotate while this action occurs. The pivotal mounting of the tilt channel 19 on the yoke 16 allows the plunger to swing with the kiln through the small angle necessary for the plunger to enter the tap hole briefly. The flared shape of the tap hole allows some tolerance in the angle the plunger assumes with respect to the kiln when the plunger is within the tap hole; that is, the plunger need not lie exactly on a radius of the kiln.

To minimize any chance of misalignment, I prefer to start the plunger turning with the kiln before the plunger enters the tap hole. For this purpose the kiln shell carries a lug 32 longitudinally offset from the tap hole (Figure 1), and the tapping device 14 includes a cooperating trip mechanism. The latter comprises a longitudinal shaft 33 journaled in a plurality of aligned brackets 34 which are mounted on the supporting beam 15 and also on a second such beam 15a spaced from the former beam (Figures 3 and 4). The shaft 33 carries a trip arm 35, which is located in a position where the lug 32 can engage it, and an operating arm 36, both arms being fixed on the shaft. The back end of the trip arm rests on an adjustable stop 37 on the beam 15a and carries a counterweight 38 (Figures 2 and 4). A lever 39 is pivoted to the underside of the beam 15 and is connected to the operating arm 36 of the shaft 33 through links 40. The lever 39 preferably is sectional to permit adjustment in its length. A roller 41 is journaled to the lever 39 at its joint with the links 40. The extremity of the tilt channel 19 carries a roller plate 42. The counterweight 24 on the tilt channel normally holds the latter in a position where the roller plate 42 engages the roller 41, that is, at the starting end of the path of movement of the tilt channel.

During each kiln revolution, as the tap hole 13 moves into alignment with the plunger 27, the lug 32 engages the trip arm 35. Thereupon the trip arm 35 commences to turn the shaft 33 counterclockwise. The operating arm 36 acts through the links 40 to push the lever 39 downwardly. The roller 41 in turn pushes the tilt channel 19 downwardly. Shortly after the plunger commences thus to swing, the timing mechanism acts to push it into the tap hole. After the plunger enters, the lug 32 moves away from the trip arm 35, and the tilt channel swings freely with the kiln. The lug 32 must of course be offset longitudinally from the tap hole a sufficient distance that it clears the tilt channel 19 and the plunger 27 as it moves past. However, the exit end portion of the kiln is the hottest part and subject to considerable warpage. Therefore, I prefer to locate the lug a sufficient distance from the tap hole that such warpage does not interfere with its action.

As a safety feature, the piston rod 25 preferably extends through the back of the cylinder 21 and carries a microswitch 43 at its back end. The piston rod and back portion of the plunger 27 together contain a continuous longitudinal bore. A slender rod 44 is slidably mounted in this bore and extends from the plunger to the microswitch. As long as the plunger is properly seated on the piston rod, the rod 44 exerts pressure on the microswitch and holds it closed. If the plunger breaks off for any reason, such as misalignment with the tap hole, the rod ceases to exert pressure on the microswitch and allows the latter to open. The microswitch is connected in the drive circuit to the kiln, and the kiln immediately stops when the switch opens.

At the time the plunger 27 enters the tap hole 13, the material at the hole is partially frozen, but still sufficiently soft that the plunger can break through and open the hole. Shortly after plunger retracts, the hole rotates to a position where molten material M can flow out to a receiver beneath. The material discharges through approximately the next 120° of kiln rotation, the hole remaining open as long as material is flowing through it. The parts are proportioned so that the amount of material discharged each revolution approximately equals the amount melted, whereby the pool level at the conclusion of each discharge cycle remains substantially constant.

Figures 5 and 6 show a preferred receiver for cooling and granulating the material discharged from the kiln 10. The receiver comprises a water cooled conveyor screw 50 which is journaled in a box 51 beneath tap hole portion of the kiln. The axis of the screw is at right angles to the kiln axis. The screw is driven continuously in a counterclockwise direction as viewed in Figure 6 by a motor 53 (Figure 2) located at the end away from which the material travels. The peripheries of the screw blades advantageously carry an edging of hard material, for example, of the cobalt-chromium-tungsten alloy sold under the trademark "Stellite." Likewise the faces of these blades can carry radial beads of the same material.

The conveyor box 51 has a round bottom 54 and a water jacket 55 surrounding said bottom. The round bottom receives the screw 50 rather closely, there being a clearance between the bottom and the periphery of the screw of about a half inch. Cooling water is introduced periodically to the water jacket 55 via an inlet 56 and discharges over the blades of the screw 50 through two series of spray holes 57, which are located on opposite sides of the screw in staggered relation. The top of the box 51 carries a splash guard 58 to permit high speed operation of the screw. To provide a proper granulating action on the material discharged into the conveyor, I prefer to operate the screw at a rate of about 250 r.p.m. This speed is considerably above the critical at which centrifugal force would throw the material out. For example, the critical speed of a 12 inch diameter screw conveyor is about 76 r.p.m. However, the splash guard catches the material and retains it in the conveyor.

The portion of the box 51 under the orbit of the tap hole 13 is open to receive molten material as it discharges. Since the discharge takes place through approximately 120° rotation of the kiln, the opening necessarily is of considerable length. The timing mechanism starts water flowing into the inlet 56 just before material commences to discharge from the tap hole and cuts off the water after the discharge cycle is completed. The material solidifies in the conveyor and becomes granulated. It is then pushed out the end into a pit 59.

Figure 7 shows schematically a preferred control circuit for both the tapping device 14 and the water to the screw conveyor. The circuit includes a transformer 65 whose primary winding is connected to a suitable outside power source. One end of the secondary winding is grounded and the other is connected to a main switch 66 which is closed to set up the mechanism for operation. A pair of timer disks 67 and 68 for the tapping device and the water to the screw conveyor respectively are mechanically connected to the kiln drive and rotate at the same speed as the kiln.

The timer disk 67 for the tapping device carries a grounded contact arm 69 which engages a fixed contact 70 when the plunger 27 is in line with the tap hole 13. One end of the coil of a relay A is connected to the main switch 66 and the other end is connected to the contact 70. Consequently relay A picks up when the arm 69 engages this contact but otherwise drops out. The four-way valve 30 has an operating solenoid 71, one end of which is grounded and the other end of which is connected to the main switch 66 via a set of normally open contacts of the relay A. When the relay picks up and its contacts close, the solenoid is energized and shifts the position of the valve 30. The cylinder 21 projects the plunger 27 into the tap hole. However, the contact arm 69 engages the contact 70 only momentarily, so that relay A quickly drops out, and the solenoid 71 is deenergized and the valve 30 returns to its normal position to retract the plunger.

Preferably a directional relay B has its coil connected in the drive circuit to the kiln 10 and its contacts connected in series with the coil of relay A. As long as the kiln is driven in its normal direction, relay B is energized and its contacts remain closed to allow regular operation of the tapping device. If the kiln is driven in reverse, relay B drops out to prevent relay A from picking up. Consequently the tapping device is in effect disconnected and does not interfere with reverse driving of the kiln.

One side of the microswitch 43 is connected to the main switch 66 and the other side is connected to the coil of a relay C. The other end of this coil is grounded. Relay C has a set of contacts which are connected in series with the kiln drive. As long as the microswitch is closed, relay C is energized and its contacts are closed allowing the kiln to operate. If the microswitch opens, relay C drops out and the kiln stops.

The timer disk 68 for the water to cool the screw conveyor carries a grounded contact segment 72 which is adapted to engage a fixed contact 73. The parts are adjusted so that the segment 72 engages the contact 73 just before material commences to flow from the tap hole 13 and disengages after such flow ceases. One end of the coil of a relay D is connected to the main switch 66 and the other end is connected to the contact 73. Consequently relay D picks up when the segment 72 engages this contact, but otherwise drops out. Relay D has a set of normally open contacts which are connected in series between the main switch 66 and one end of a solenoid 74, the other end of the latter being grounded. The solenoid 74 operates an air valve 75, which controls a pressure operated water valve 76. Normally the air valve 75 is open and admits air pressure to the water valve 76 to keep the latter closed. When relay D picks up and energizes the solenoid 74, the air valve 75 closes and cuts off the air to the water valve 76. The latter then admits cooling water to the conveyor box 51 via the inlet 56. The flow of water continues until the contact segment 72 clears the contact 73, whereupon relay D drops out, the solenoid 74 is deenergized, the air valve 75 opens, and the water valve 76 closes.

From the foregoing description it is seen that my invention affords a simple method and apparatus for tapping molten material from a rotary kiln during each kiln revolution. The need to stop the kiln for tapping is eliminated altogether, with a resultant saving in production time and conservation of heat. The improved receiver produces a granulated solidified product, which facilitates subsequent pulverizing over the usual large chunks produced when the product solidifies.

While I have shown and described only a single embodiment of the invention, it is apparent that modifications may arise. Therefore, I do not wish to be limited to the disclosure set forth but only by the scope of the appended claims.

I claim:

1. The combination, with a rotary kiln having a tap hole, of a tapping device comprising a stationary frame located at the side of the kiln which normally moves downwardly as the kiln rotates, means movably mounted on said frame for entering said tap hole from outside the kiln while the kiln is rotating and thus opening the tap hole, and a receiver beneath the kiln for receiving molten material flowing from said tap hole while the kiln rotates through a substantial arc with the tap hole on the underside.

2. The combination, with a rotary kiln having a tap hole, of a tapping device comprising a stationary frame located at the side of the kiln which normally moves downwardly as the kiln rotates, means movably mounted on said frame for entering said tap hole from outside the kiln while the kiln is rotating and thus opening the tap hole, means for actuating said entering means during each kiln revolution as the tap hole travels therepast, and a receiver beneath the kiln for receiving molten material flowing from said tap hole during each revolution while the kiln rotates through a substantial arc with the tap hole on the underside.

3. The combination, with a rotary kiln having a tap hole, of a tapping device comprising a stationary frame located at the side of the kiln which normally moves downwardly as the kiln rotates, means movably mounted on said frame for entering said tap hole from outside the kiln while the kiln is rotating and thus opening the tap hole, and timing means coordinated with rotation of said kiln for actuating and withdrawing said entering means during each kiln revolution as the tap hole travels therepast, and a receiver beneath the kiln for receiving molten material flowing from said tap hole during each kiln revolution while the kiln rotates through a substantial arc with the tap hole on the underside.

4. The combination, with a rotary kiln having a tap hole, of a tapping device comprising a stationary frame located at the side of the kiln which normally moves downwardly as the kiln rotates, means movably mounted on said frame for entering said tap hole from outside the kiln while the kiln is rotating and thus opening the tap hole, trip means for starting said entering means swinging with the kiln as the tap hole becomes aligned therewith, and timing means coordinated with rotation of said kiln for actuating and withdrawing said entering means while the latter is swinging with the kiln, and a receiver beneath the kiln for receiving molten material from said tap hole while the kiln rotates through a substantial arc with the tap hole on the underside.

5. The combination, with a rotary kiln having a tap hole, of a tapping device comprising a stationary frame located at the side of the kiln which normally moves downwardly as the kiln rotates, a support pivotally mounted on said frame adjacent said kiln to swing through a limited angle with the kiln, motive means carried by said support, a plunger carried by said motive means and adapted to enter said tape hole while the kiln is rotating and thus open the tap hole, and timing means coordinated with rotation of said kiln for actuating said motive means to project and retract said plunger during each kiln revolution as the tap hole becomes aligned with the plunger, and a receiver beneath the kiln for receiving molten material flowing from said tap hole during each kiln revolution while the kiln rotates through a substantial arc with the tap hole on the underside.

6. The combination, with a rotary kiln having a tap hole, of a tapping device comprising a stationary frame located at the side of the kiln which normally moves downwardly as the kiln rotates, a support pivotally mounted on said frame adjacent said kiln to swing through a limited angle with the kiln, means normally holding said support at the starting end of its path of movement, reciprocable motive means carried by said support, a plunger carried by said motive means and adapted to be operated thereby, and timing means coordinated with rotation of said kiln for actuating said motive means to project said plunger into said tap hole when the latter becomes aligned with the plunger and to retract the plunger while the support is swinging with the kiln, and a receiver beneath said kiln for receiving molten material flowing from said tap hole while the kiln rotates through a substantial arc with the tap hole on the underside.

7. A combination as defined in claim 6 in which said tap hole flares outwardly to allow tolerance in the approach angle of said plunger.

8. The combination, with a rotary kiln having a tap hole, of a tapping device comprising a stationary frame located at the side of the kiln which normally moves downwardly as the kiln rotates, a support pivotally mounted on said frame adjacent said kiln to swing through a limited angle with the kiln, means normally holding said support at the starting end of its path of movement, reciprocable motive means carried by said support, a plunger carried by said motive means and adapted to be operated thereby, trip means pivoted to said frame and engaging said support, means on the kiln for operating said trip means to swing said support and said plunger with the kiln as said tap hole becomes aligned with said plunger, and timing means coordinated with rotation of said kiln for actuating said motive means to project said plunger into said tap hole and retract it while the support is swinging with the kiln, and a receiver beneath said kiln for receiving molten material flowing from said tap hole while the kiln rotates through a substantial arc with the tap hole on the underside.

9. The combination, with a rotary kiln having a tap hole, of a tapping device comprising a stationary frame located at the side of the kiln which normally moves downwardly as the kiln rotates, a support pivotally mounted on said frame adjacent said kiln to swing through a limited angle with the kiln, means normally holding said support at the starting end of its path of movement, a double-acting pneumatic cylinder carried by said support, a plunger carried by said cylinder and adapted to enter said tap hole while the kiln is rotating and thus to open the tap hole, trip means pivoted to said frame and engaging said support, means on the kiln for operating said trip means during each kiln revolution to swing said support and said plunger with the kiln each time said tap hole becomes aligned with said plunger, and timing means coordinated with rotation of said kiln for actuating said cylinder to project said plunger into said tap hole and retract it while the support is swinging with the kiln, said tap hole flaring outwardly to allow tolerance in the approach angle of said plunger, and a receiver beneath said kiln for receiving molten material flowing from said tap hole during each kiln revolution while the kiln rotates through a substantial arc with the tap hole on the underside.

10. The combination, with a rotary kiln having a tap hole, of a tapping device comprising a stationary frame located at the side of the kiln which normally moves downwardly as the kiln rotates, means movably mounted on said frame for entering said tap hole from outside the kiln while the kiln is rotating and thus opening the tap hole, and a water-cooled screw conveyor beneath the kiln having its axis at right angles to that of the kiln, said conveyor being adapted to receive molten material flowing from said tap hole while the kiln rotates through a substantial arc with the tap hole on the underside and to granulate the material as it solidifies.

11. The combination, with a rotary kiln having a tap hole, of a tapping device comprising a stationary frame located at the side of the kiln which normally moves downwardly as the kiln rotates, means movably mounted on said frame for entering said tap hole from outside the kiln while the kiln is rotating and thus opening the tap hole, means for actuating said entering means during each kiln revolution as the tap hole travels therepast, and a water-cooled screw conveyor beneath the kiln having its axis at right angles to that of the kiln, said conveyor having an opening of substantial length to receive molten material flowing from said tap hole during each kiln revolution while the kiln rotates through a substantial arc with the tap hole on the underside and being adapted to granulate the material as it solidifies.

12. The combination, with a rotary kiln having a tap hole, of a tapping device comprising a stationary frame located at the side of the kiln which normally moves downwardly as the kiln rotates, means movably mounted on said frame for entering said tap hole from outside the kiln while the kiln is rotating and thus opening the tap hole, and timing means coordinated with rotation of said kiln for actuating and withdrawing said entering means during each kiln revolution as the tap hole travels therepast, and a water-cooled screw conveyor beneath the kiln having its axis at right angles to that of the kiln, said conveyor having an opening of substantial length to receive molten material flowing from said tap hole during each kiln revolution while the kiln rotates through a substantial arc with the tap hole on the underside and being adapted to granulate the material as it solidifies, and additional timing means coordinated with rotation of said kiln for starting flow of cooling water to said conveyor ahead of the flow of material from said tap hole and cutting off flow of water after flow from the tap hole ceases.

13. A device for entering the tap hole of a rotary kiln while the latter is rotating comprising a stationary frame, a support pivotally mounted on said frame, reciprocable motive means carried by said support, a plunger carried by said motive means, trip means carried by said frame and cooperable with said support to swing the support and plunger with the kiln as the tap hole thereof becomes aligned with said plunger, and timing mechanism adapted to be connected with the kiln for actuating said motive means to project and retract said plunger while said support and plunger are swinging.

14. A device as defined in claim 13 in which swinging movement of said support is confined to a limited angle and including means normally holding said support at the starting end of its path of movement.

15. A receiver for molten material from a rotary kiln comprising a conveyor screw, a box having a rounded bottom housing said screw, a water jacket on the outside of said rounded bottom, said bottom having openings for discharging water from said jacket over said screw, a guard fixed to the top of said box over said screw allowing the latter to rotate at speeds above the critical while retaining material therein, the top of said box having an elongated opening alongside said guard to admit molten material, and means for driving said screw.

16. A tapping device comprising mechanical means for entering a tap hole in the side of a rotary kiln while the latter is rotating, a stationary frame mounting said mechanical means for limited rotational movement with the kiln, and timing means for moving said mechanical means into and out of the tap hole when rotation of the kiln brings the tap hole into alignment therewith.

17. A tapping device comprising means for entering a tap hole in the side of a rotary kiln while the latter is rotating, motive means for operating said entering means, a stationary frame mounting said entering and motive means for limited rotational movement with the kiln, trip means for moving said entering and motive means with the kiln as the tap hole comes into alignment with said entering means, and timing means effective to operate said motive means to move said entering means into and out of the tap hole during their limited movement with the kiln.

18. A tapping device comprising a stationary frame, a support mounted on said frame for swinging movement, motive means carried by said support, means operated by said motive means for entering a tap hole in the side of a rotary kiln to clear the hole of frozen material, swinging movement of said support enabling said entering means to move with the tap hole while the kiln is rotating, timing means for starting operation of said motive means as the tap hole rotates into alignment with said entering means, and means for thereafter returning said support to its starting position.

19. A tapping device comprising a stationary frame, a support mounted on said frame for swinging movement on both horizontal and vertical axes, motive means carried by said support, a plunger operated by said motive means and adapted to project into a tap hole in the side of a rotary kiln and retract and thus clear the hole of frozen material, swinging movement of said support enabling said plunger to enter the tap hole and move therewith while the kiln is rotating, timing means for starting operation of said motive means as the tap hole rotates into alignment with said plunger, and means for returning said support to its starting position after said plunger retracts.

20. A tapping device comprising a stationary frame, a support mounted on said frame for swinging movement, motive means carried by said support, means operated by said motive means for entering a tap hole in the side of a rotary kiln to clear the hole of frozen material, swinging movement of said support enabling said entering means to move with the tap hole while the kiln is rotating, trip means cooperable with said support to start it swinging as the tap hole rotates into alignment with said entering means, timing means for starting operation of said motive means after said support commences to swing, and means for thereafter returning said support to its starting position.

21. A tapping device comprising a stationary frame, a support mounted on said frame for swinging movement on both horizontal and vertical axes, motive means carried by said support, a plunger operated by said motive means and adapted to project into a tap hole in the side of a rotary kiln and retract and thus clear the tap hole of frozen material, swinging movement of said support enabling said plunger to enter the tap hole and move therewith while the kiln is rotating, trip means cooperable with said support to start it swinging as the tap hole rotates into alignment with said plunger, timing means for starting operation of said motive means after said support commences to swing, and means for returning said support to its starting position after said plunger retracts.

22. A tapping device as defined in claim 21 in which said trip means includes a shaft journaled to said frame, a trip arm and an operating arm fixed to said shaft in spaced apart relation, and levers connected to said operating arm and said frame and engageable with said support when a rotating kiln engages said trip arm.

23. A method of tapping molten but easily frozen material from a rotary kiln comprising clearing the tap hole of the kiln of frozen material by entering it during a portion of each kiln revolution while the kiln is rotating and as the tap hole is moving downwardly approaching the underside of the kiln, and receiving molten material flowing from the cleared tap hole when the latter rotates to the underside of the kiln during each kiln revolution and while the kiln is rotating through a substantial arc.

24. In the operation of a rotary kiln having a tap hole in its side wall, a method of tapping molten material which tends to freeze and close the tap hole comprising mechanically entering the hole and thereby clearing it of frozen material during a portion of each kiln revolution while the kiln is rotating and as the tap hole is moving downwardly approaching the underside of the kiln, and receiving molten material flowing from the cleared tap hole when the latter rotates to the underside of the kiln during each kiln revolution and while the kiln is rotating through a substantial arc.

25. In the operation of a rotary kiln having a tap hole in its side wall and wherein molten material in the kiln freezes over the tap hole as the tap hole is moving upwardly and across the upper side of the kiln, a method of tapping molten material from the kiln comprising mechanically entering the tap hole and thereby clearing it of frozen material during a portion of each kiln revolution while the kiln is rotating and as the tap hole is moving downwardly approaching the underside of the kiln, and receiving molten material flowing from the cleared tap hole when the latter rotates to the underside of the kiln during each kiln revolution and while the kiln rotates through a substantial arc.

References Cited in the file of this patent

UNITED STATES PATENTS

| Number | Name | Date |
|---|---|---|
| 56,595 | Morris et al. | July 24, 1866 |
| 433,136 | Peck | July 29, 1890 |
| 1,117,644 | Donaldson | Nov. 17, 1914 |
| 1,186,358 | Witz | June 6, 1916 |
| 1,361,103 | Scott | Dec. 7, 1920 |
| 1,373,581 | Wurst | Apr. 5, 1921 |
| 1,455,313 | Vreeland | May 15, 1923 |
| 1,916,402 | Allen | July 4, 1933 |
| 2,057,099 | Ingraham | Oct. 13, 1936 |
| 2,404,650 | Newkirk et al. | July 23, 1946 |
| 2,410,236 | Reaney | Oct. 29, 1946 |